A. R. Reese.

Harvester Rake.

№ 2465 Reissued Jan. 22, 1867.

Witnesses.

Geo. E. Buckley.

Jno. B. Miller.

Inventor.

Adam R. Reese.

by his Atty.

A. E. Shaw.

UNITED STATES PATENT OFFICE.

ADAM R. REESE, OF PHILLIPSBURG, NEW JERSEY.

IMPROVEMENT IN HARVESTER-RAKES.

Specification forming part of Letters Patent No. 54,406, dated May 1, 1866; Reissue No. 2,465, dated January 22, 1867.

*To all whom it may concern:*

Be it known that I, ADAM R. REESE, of Phillipsburg, in the county of Warren, State of New Jersey, did invent certain new and useful Improvements in Harvesters, of which the following is a full, clear, and exact description, reference being had to the accompanying drawings, which make part of this specification, and in which—

Figure 1:
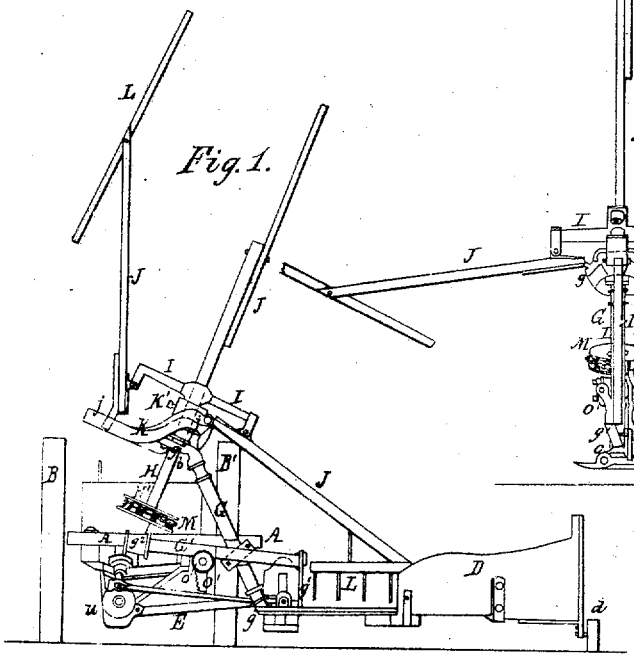
Figure 2:
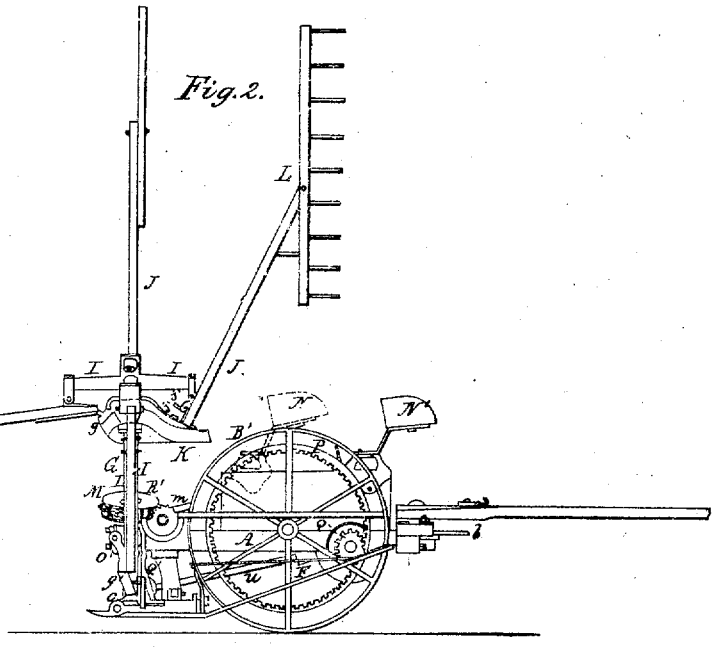

Figure 1 represents a view in elevation of a two-wheeled hinge-joint mowing-machine with these improvements applied thereto; Fig. 2, a similar view of the same, as seen from the divider side thereof, with the finger-beam and platform removed; and Fig. 3, a plan or top view of the machine.

This invention relates to that class of two-wheeled hinge-joint harvesters in which is a series of arms revolving on a vertical axis, or one nearly so, and so arranged as to conform to the undulations of the platform, and to serve the purposes both of a reel and of a rake; and its object is so to arrange the mechanism as to permit a driver to ride on the machine without danger of being struck by the rake; to which end the improvement herein claimed consists in combining, with a two-wheeled hinge-joint harvester, a combined reel and rake, consisting of a series of arms revolving on a vertical axis, or one nearly so, mounted upon the finger-beam or platform, so as to conform to the undulations of the platform, and driven from the main frame, said rake-arms being so controlled by a guide-cam as to be nearly vertical when passing over the main frame, whereby the driver's seat is enabled to be located upon the main frame outside of the path described by the rake, and thus avoid all danger of striking him, substantially as hereinafter described.

The invention further consists in an X-shaped tubular frame for connecting, bracing, and supporting the rake and finger-beam, as hereinafter described.

In the accompanying drawings, the improvements are shown as applied to a "Ball mowing-machine," (which is one of the class known as "hinge-joint harvesters,") for the purpose of adapting it both to reaping and gathering grain.

The main frame A rests upon two supporting and driving wheels, B $B^1$, keyed upon and ordinarily turning with the same axle $B^2$.

The finger-beam C and platform D are hinged to the frame in the usual way by means of a drag-bar, E, and coupling arm or link F. The outer or grain end of the platform is supported by a small wheel, *d*.

The raking mechanism is mounted in a frame consisting of a piece of wrought-iron pipe, G, having a foot or socket, *g*, of cast or wrought iron, bolted to the inner end of the finger-beam. A smaller piece of pipe, G′, crosses this standard G nearly at right angles thereto, and so as to lie horizontal, or nearly so, and is strongly bolted thereto near its middle. Its inner end is secured to the finger-beam by a bar, $g^1$, while its outer end carries a step, $g^2$, in which the foot of the rake shaft or spindle H turns. The spindle likewise turns, near its upper end, in a bearing, $g^3$, in the upper end of the rake-post G. By this mode of construction a strong, light, and rigid support is secured for the rake.

Four cross-arms, I, are secured upon and turn with the spindle H. The rake-arms J are pivoted or hinged near their inner ends to the outer ends of these cross-arms in such manner as to vibrate freely in a vertical plane, while their inner ends carry friction-rollers *j*, which run in the grooves of an eccentrically-curved stationary cam-ring, K, secured upon the post G by a set-screw, K′, which renders the cam-ring adjustable vertically upon the post.

A stop-pin, $j^1$, is mounted on the inner end of each of the levers J, although only one is shown in the drawing, and a plate-spring, $j^2$, is likewise interposed between the inner ends of these levers and the cross-arms I. When the rake is sweeping over the platform, the stop-pin $j^1$ bears against the front side of the cross-arms, and thus prevents the pivots of the rake-arms from being strained. The spring $j^2$ is for the purpose of assisting the rake to rise the moment it has finished sweeping the grain off the platform, (the cam-ring being suitably covered at the proper point for this purpose,) and thus prevent dragging or scattering the gavels.

In the drawings only one of the rake-heads, L, is shown as having teeth. One rake is generally sufficient, and I prefer to leave the other heads without teeth, as when thus arranged they act as reel-ribs to press the standing grain back upon the platform, but not to rake it off. Teeth may, however, be inserted in as many of of the heads as desired.

As the main frame A, on which the driving-gearing is mounted, always maintains a fixed relation to the ground, while the finger-beam, platform, and rake rise and fall in conformity to the undulations of its surface, it becomes necessary to devise some means for driving the rake uniformly in whatever position it may assume. To do this a sprocket-wheel, H′, is mounted upon the rake-spindle, and the rake is driven by a chain encircling the sprocket-wheel, and a corresponding pulley, $B^3$, on the driving-axle, $B^2$.

In the early experiments with this rake much difficulty was encountered from the slipping of the chain. The following method was therefore devised of driving the rake with a slack chain, and without liability to slip.

A common trace-chain, M, is employed with straight links, and, instead of pins on the sprocket-wheel, a deep longitudinal groove is formed in the periphery of the wheel for one side of the links to enter, and it is also divided transversely into cells of a size corresponding to that of the links.

Figure 3:
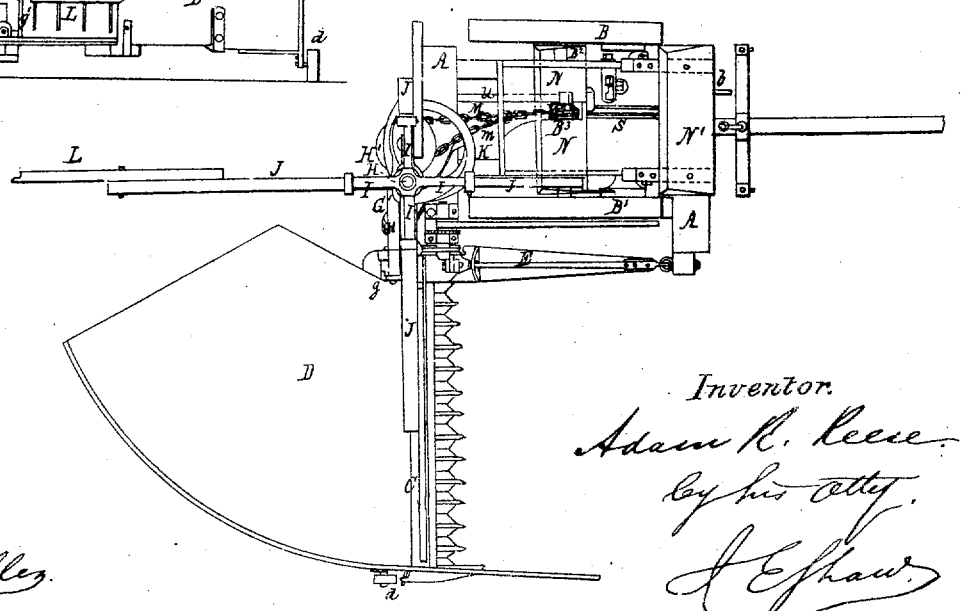

The driving-pulley $B^3$ is constructed in a similar manner, and thrown into and out of gear by a sliding clutch, operated by a foot-lever, *b*, extending forward to a point near the driver's seat, as shown in Fig. 3. By this mode of construction of the chain-pulleys, one side of the chain M is always kept taut while the other side runs slack, as shown in Fig. 3, so that an increase of several inches in the length of the chain will not in the least affect the working of the rake.

The chain passes over a spring-guide, *m*, just before encircling the sprocket-wheel H′, which prevents it from slipping off or dropping below the wheel.

A seat, N, for the driver is mounted upon the frame A. When used as a reaper, this seat is located on the front of the frame, near the rear end of the tongue, where, as shown in Fig. 2 of the drawings, the driver is out of the way of the rake, and so located as to aid materially in counterbalancing its weight. When used as a mower, the rake and platform are, of course, removed, and the driver's seat is then shifted to the position shown by the dotted lines in Fig. 2, to counterbalance the weight of the tongue.

To prevent the finger-beam and rake from falling too low, a stop, O, is mounted upon the rear of the main frame, between the driving-wheels, as shown in Fig. 1. The horizontal arm G′ rests upon this stop, and prevents any farther descent of the finger-beam, but leaves it free to rise. This stop can be adjusted vertically by means of a set-screw and ratchet-plates O′. This stop, moreover, performs another very important function, viz., that of supporting the weight of the finger-beam, platform, and raking mechanism at a point between the driving-wheels, instead of outside of them, by which means the balance of the machine laterally is preserved, and the side draft diminished.

The cutters are driven by internally-geared spur-wheels P on the driving-wheels meshing into spur-pinions Q on the counter-shaft R, which carries a bevel-wheel, S, driving a corresponding pinion, T, on the crank-shaft U. The spur-pinions have backing-ratchets on them, as usual in mowing-machines of this class, to prevent the cutters from working when backing.

When mowing, both wheels are used as drivers. This plan, however, does not answer with my rake. The driving-wheels are, ordinarily, keyed fast to and turn with the axle; but when raking the key is removed from the outer wheel B, in order that it may run loosely on the axle, and not turn the rake when the cutters are not working, as this would cause it to comb the grain down upon the platform, without its first being severed.

This machine, when mowing, operates just like the ordinary Ball mower, and no description of it is, therefore, required here. To adapt it to raking, the driver's seat N is moved forward from the position N (shown by the dotted lines in Figs. 2 and 3) to the position N′. The platform and raking mechanism are then attached.

As the machine advances the rake-arms rise and fall and sweep over the platform in their proper relations, being controlled in their movements by the guide or cam ring K.

By reference to the drawings it will be seen that, while passing over the main frame, these rake-heads and blank arms are vertical, and that the driver's seat is outside of the path described by them, thus avoiding all danger of striking the driver.

By pivoting each rake-arm separately, it will be seen that an ample space is obtained in which to locate the driver's seat. The rake-arms can likewise be elevated sufficiently to avoid striking the driver, and can be even caused to revolve without passing over his head.

By this invention a finger-beam may be used capable of conforming freely to the undulations of the ground, and an automatic rake, which always maintains its proper relation to the platform, can play freely up and down with respect to the main frame, and yet can be driven from it uninterruptedly, and without straining or binding the gearing, while the weight of the raking mechanism is supported between the main wheels, and the driver is permitted to ride on the machine, not only without danger of being struck by the rake, but in a position where his weight is of material assistance in counterbalancing the weight of the raking mechanism.

Having thus described the invention of said ADAM R. REESE, what is claimed as new, and desired to secure by Letters Patent, is—

1. In a harvester having a hinged cutting apparatus, the combination of a revolving rake and reel, attached to and vibrating with the platform of said harvester, and a driver's seat located upon the main frame, the whole so arranged and operating that the rakes shall not revolve over the driver.

2. The combination of a hinged cutting apparatus, a driver's seat on the main frame, and hinged radial rake or reel arms.

3. The combination of the finger-beam and main frame with the tubular X-shaped frame G G′, as described, for the purpose of supporting and bracing the rake-shaft.

4. The combination of a revolving rake and reel, attached to and moving with the platform of a hinged finger-beam machine, an endless chain, and sheaves having pockets or cells, whereby the revolving rake and reel can be driven while it is free to rise and fall with the platform.

5. The combination of an endless driving-chain, a pulley on the main shaft, a corresponding pulley on the vertical, or nearly vertical, revolving reel and rake shaft mounted on the finger-beam or its extension, and the intermediate guide for guiding the chain between the main shaft and rake-shaft.

ADAM R. REESE.

Witnesses:
BENJ. MCMAKIN, Jr.,
JOHN WHITE.